US005334926A

United States Patent [19]

Imaizumi

[11] Patent Number: 5,334,926
[45] Date of Patent: Aug. 2, 1994

[54] ELECTRIC POWER SYSTEM FOR AUTOMOTIVE VEHICLE

[75] Inventor: Katsuhiro Imaizumi, Yokosuka, Japan

[73] Assignee: Nissan Motor Co., Ltd., Yokohama, Japan

[21] Appl. No.: 40,255

[22] Filed: Mar. 30, 1993

[30] Foreign Application Priority Data

Mar. 31, 1992 [JP] Japan .................................. 4-077822

[51] Int. Cl.⁵ ............................ H02J 7/14; H02P 9/30
[52] U.S. Cl. ........................................ 320/15; 307/16; 322/90; 322/7
[58] Field of Search ................ 320/15; 307/16; 322/7, 322/90

[56] References Cited

U.S. PATENT DOCUMENTS

| 4,214,198 | 7/1980 | Schneider | 320/15 |
| 4,692,684 | 9/1987 | Schaeffer | 322/90 |
| 4,868,480 | 9/1989 | van der Linde | 322/90 X |
| 4,992,672 | 2/1991 | Norton | 322/90 X |

*Primary Examiner*—R. J. Hickey
*Attorney, Agent, or Firm*—Foley & Lardner

[57] ABSTRACT

An electric power system for an automotive vehicle is provided with a generator to which a 48-volt battery, a blower motor and a DC—DC converter are connected in parallel. An output terminal of the converter is connected to a load which is constituted by a 12-volt battery, a head lamp, a vehicle speed sensor and a resistance to which a switch is connected in series. The system is further provided with a voltmeter for detecting a voltage value of the 12-volt battery and an ammeter for detecting a load current applied to the load, a controller for controlling the converter and the switch. The controller controls the converter to start operation and the switch to be turned on when the voltage value detected by the volt-meter is lower than a first predetermined value and the load current detected by the ammeter is smaller that a second predetermined value. Accordingly, an operating period of the converter is shortened and therefore an energy loss generated in the system is suppressed.

3 Claims, 6 Drawing Sheets

ELECTRIC POWER SYSTEM FOR AUTOMOTIVE VEHICLE

BACKGROUND OF THE INVENTION

1. Field of the Invention

The present invention relates to improvements in an electric power system for an automotive vehicle and, more particularly, to an electric power system which has both a high rated voltage source and a low rated voltage source.

2. Description of the Prior Art

In recent years, automotive vehicles provide an electric load which operates at a high efficiency by using a high-voltage electric power. Japanese Patent Provisional Publication No. 1-185197 discloses an electric power system applicable to an automotive vehicle having such a high-voltage load. Such an electric power system is provided with a generator, which generates 48-volt direct-current electric power, a 48-volt battery and a DC—DC converter (direct-current to direct-current converter) which converts the 48-volt direct-current electric power to a 12-volt direct-current electric power. The generator is connected to the 48-volt battery and a high-voltage load, such as a blower motor. A low-voltage load, such as a head lamp or tail lamps, receives 12-volt electric power from the DC—DC converter.

However, with such a conventional electric power system, since the DC—DC converter always operates for the conversion from 48-volts to 12-volts even if the head lamps or tail lamps are not in use, an energy loss is caused by the DC—DC converter.

SUMMARY OF THE INVENTION

It is an object of the present invention to provide an improved electric power system which suppresses the energy loss generated therein.

According to the present invention, an electric power system for an automotive vehicle comprises a generator which generates an electric power by using an engine as a driving source. A high-voltage secondary battery is connected to an output terminal of the generator. A first load is connected to the generator output terminal. A converter is connected to the generator output terminal to convert electric power from a high-voltage to a low-voltage. A low-voltage secondary battery is connected to an output terminal of the converter and charged by the converter. A second load is connected to an output terminal of the low voltage secondary battery. A third load is connected to the output terminal of the low-voltage secondary battery through a switch. A volt-meter is connected to the low-voltage secondary battery and detects the voltage value of the low-voltage secondary battery. An ammeter is connected to the second and third loads and detects a load current applied to said second and third loads. A controller controls the converter, to stop operation when the volt-meter detects a voltage value larger than a first predetermined, value and to start the operation so as to charge the low-voltage secondary battery when said volt-meter detects a voltage value not larger than the first predetermined value. The controller controls the switch, to put it in a turned-on condition until the low-voltage battery is charged to a predetermined charged condition when the load current detected by the ammeter is smaller than a second predetermined value and to put it in a turned-off condition when the load current is not less than the second predetermined value.

BRIEF DESCRIPTION OF THE DRAWINGS

In the drawings, like reference numerals designate like parts and elements throughout all figures, in which.

DETAILED DESCRIPTION OF THE INVENTION

Referring to FIGS. 1 to 6, there is shown a first embodiment of an electric power system for an automotive vehicle according to the present invention.

Figure 1:
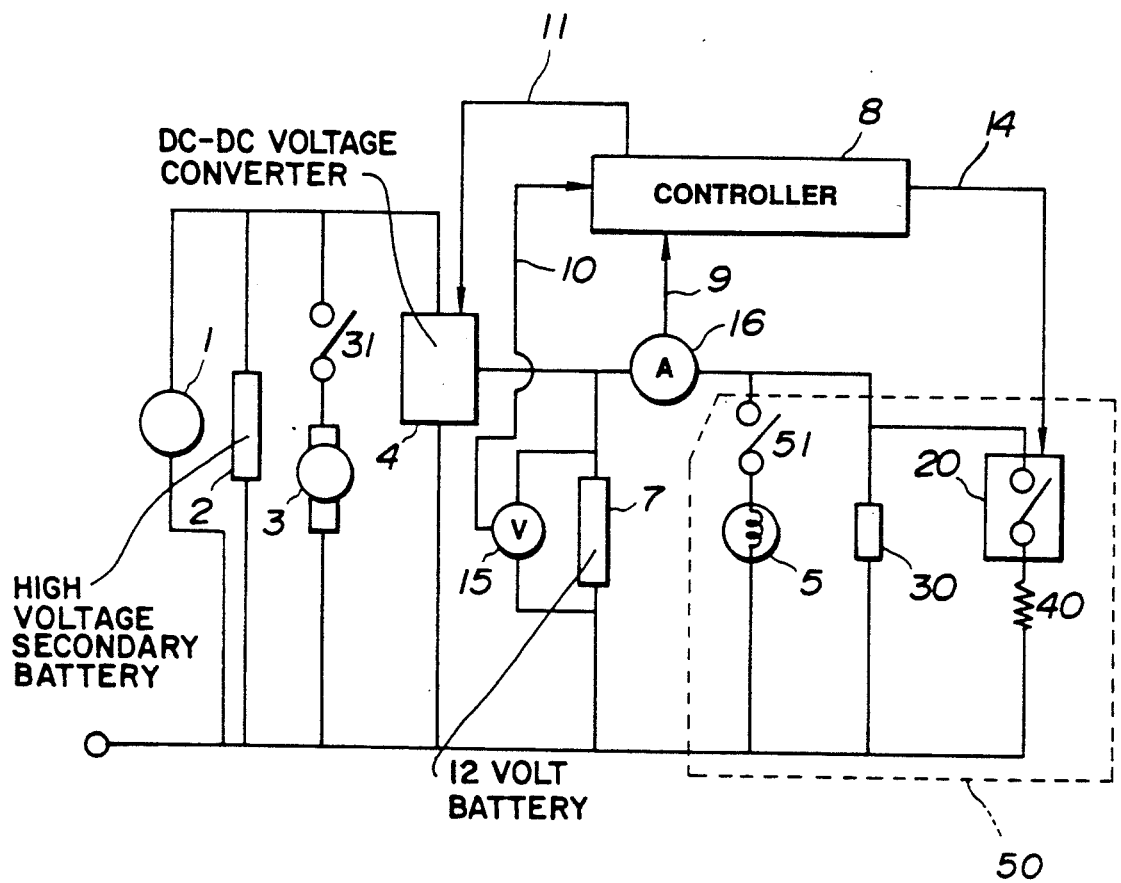
FIG. 1 is a schematic block diagram of a first embodiment of an electric power system for an automotive vehicle according to the present invention.

As shown in FIG. 1, the electric power system comprises an electric generator 1 which outputs a direct-current output of 48-volts, a 48-volt battery (high voltage secondary battery) 2 which is constituted by a lead battery having twenty-four cells, and a blower motor (first load) 3 which receives an electric power from the generator 1 and the 48-volt battery 2 through a switch 31. The switch 31 is manually operated by a driver or the like, and the blower motor 3 is operated in response to this switching operation. A DC—DC converter 4 converts the electric power voltage from 48-volt to 12-volt. A 12-volts battery (low-voltage secondary battery) 7 is arranged to supply 12-volt DC electric power to a head lamp 5, a vehicle speed sensor 30 and a resistance 40. A voltmeter (voltage detecting means) 15 is connected to the 12-volt battery 7 and detects a voltage value thereof.

The head lamp (second load) 5 is connected in parallel to the 12-volt battery 7 through a switch 51. The switch 51 is manually operated by a driver and the like, and by its turning-on operation, the head lamp 5 is electrically connected to the 12-volt battery 7 so as to receive an electric power therefrom. The vehicle speed sensor (second load) 30 is connected to the head lamp 5 in parallel. A resistance (third load) 40 is connected to the vehicle speed sensor 30 in parallel through a switch 20. The switch 20 is controlled by a controller 8, which will be mentioned later. The head lamp 5, the vehicle speed sensor 30, the resistance 40 and the switches 20 and 51 constitute a load 50 as shown in FIG. 1. The load 50 is connected to an ammeter (load electric current detecting means) 16 which detects a load current of the load 50.

Although the vehicle speed sensor 30 has been used as a load which is always operated during an engine operative condition, it is not limited to the vehicle speed sensor 30. A simple resistance may be applied to the load instead of the vehicle speed sensor 30. Furthermore, the load 40 is not directly concerned with the driving of the vehicle, and in this embodiment, a resistance replaces load 40.

The voltmeter 15 outputs a signal 10 indicative of a detected voltage of the 12-volt battery 7 to the controller 8. Similarly, the ammeter 16 outputs a signal 9 indicative of a detected load current of the load 50 to the controller 8. The controller 8 outputs an operation signal 11 to the voltage DC—DC converter 4 so as to operate it in accordance with the detected values form the signals 9 and 10. The switch 20 is turned on when the controller 8 outputs a switch signal 14 to the switch 20. That is, the controller 8 controls the switch 20 such that when the switch signal 14 is active, electric power is supplied to the resistance.

Figure 2:
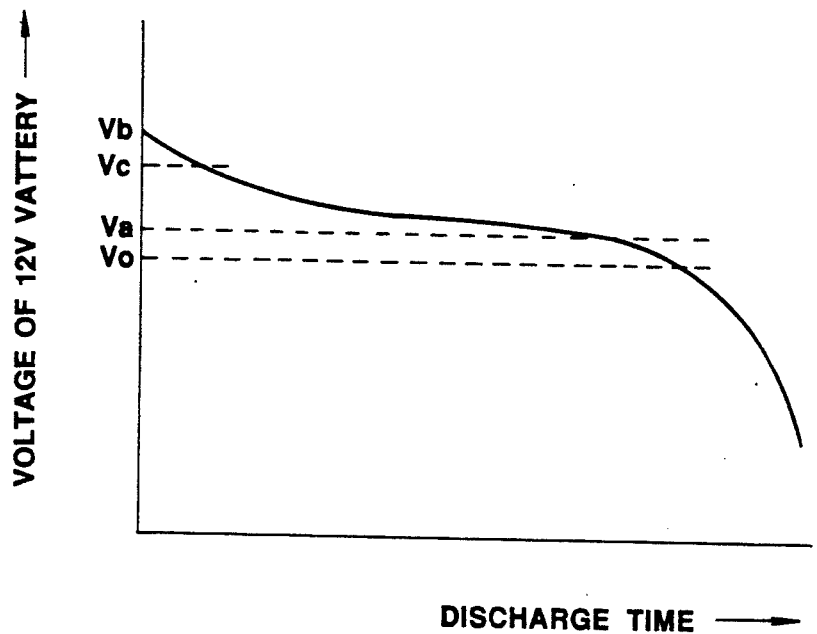
FIG. 2 is a graph showing discharge characteristics of a battery applied to the electric power system of FIG. 1.

FIG. 2 shows the discharge characteristics of the 12-volt battery 7. In this Figure, reference character Vb indicates a voltage value under a fully charged condition of the 12-volt battery 7. The voltage value is lowered according to the elapsed time when the 12-volt battery 7 is connected to the load. When the voltage of the 12-volt battery 7 becomes lower than a predetermined value Vo, the 12-volt battery 7 causes an unstable an energy supplement to the load such as, to the head lamp 5. Therefore, it is necessary to keep the voltage value of the 12-volt battery between Vb and Vo by charging. In the embodiment, the 12-volt battery 7 is arranged to be charged when the voltage value of the 12-volt battery 7 becomes lower than a value Va which is slightly higher than the value Vb. If the 12-volt battery 7 is fully charged, an over-charge is caused, and may brake the load connected to the 12-volt battery 7. Therefore, the 12-volt battery 7 is charged to a voltage value Vc which is slightly lower than the value Vb. That is to say, the 12-volt battery 7 is arranged to repeat charge and discharge, so as to keep the voltage value between the values Va and Vc.

Figure 3:
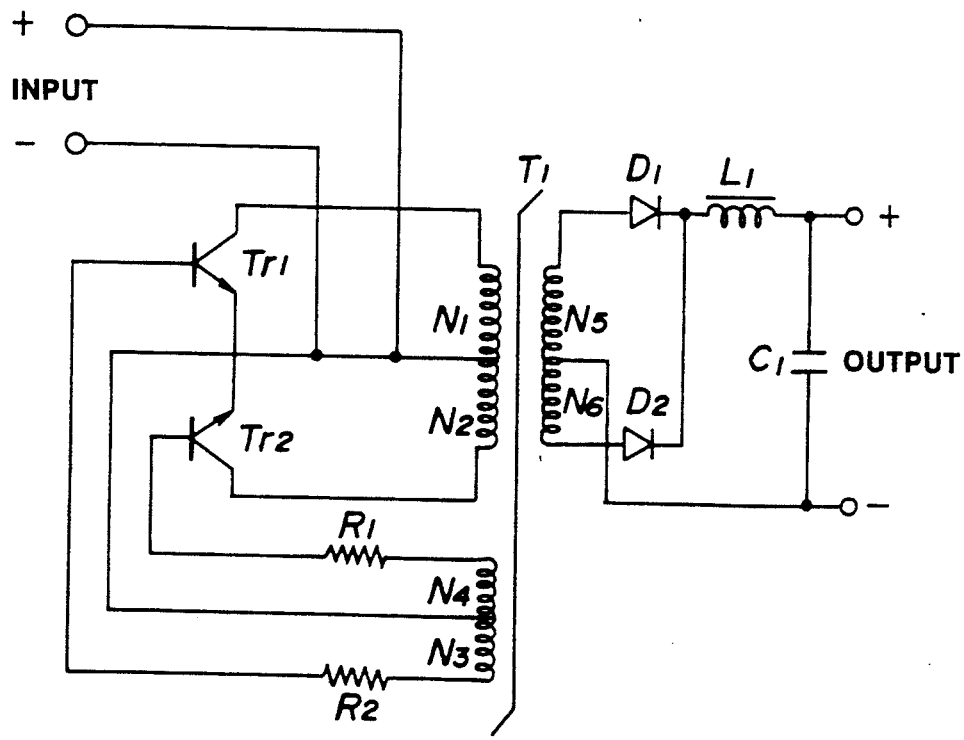
FIG. 3 is circuit diagram of a DC—DC converter applied to the electric power system of FIG. 1.

FIG. 3 shows a circuit diagram of the DC—DC converter 4 of a push-pull type. The manner of operation of the DC—DC converter 4 will be discussed hereinafter.

When the DC—DC converter 4 receives the operation signal 11 to be operated from the controller 8, the DC—DC converter 4 starts a conversion. In response to the operation signal 11, one of the transistors Tr1 and Tr2 is turned on, that is, a base of either the transistors Tr1 or Tr2 is energized. For example, when the transistor Tr1 is in a turned-on condition, an input voltage E is applied to a coil N$_1$. A voltage value induced at a coil N$_3$ puts a base voltage of the transistor Tr1 at a positive value relative to an emitter due to a magnetic flux generated by the applied voltage E to the coil N$_1$. This maintains the transistor Tr1 in the turned-on condition. On the other hand, since a voltage induced at a coil N$_4$ takes a negative value relative to a transistor Tr2, the transistor Tr2 is kept in a turned-off condition. Then, a magnetic flux in an iron core T$_1$ gradually increases from $-\phi$ to $+\phi$. Although a collector current Ic is radically increased to a product of the base current and the current amplification factor during a period the iron core magnetic flux approaches $+\phi$, the change of the magnetic flux extremely becomes small and the base voltage decayed. Accordingly, the transistor Tr1 is turned off, and each of the coils N$_1$ to N$_4$ induces a small voltage having a reverse polarity relative to that of the previous condition. The voltage of the coil N$_4$ acts to apply a positive voltage to the base of the transistor Tr2 and a negative voltage to the base of the transistor Tr1. Therefore, the transistor Tr2 is put in a turned-on condition, and the transistor Tr1 is put in a turned-off condition. Accordingly, the transistor Tr2 acts such that the input voltage is applied to the coil N$_2$, and the transistor Tr2 is kept in a turn-on condition until the magnetic flux of the iron core reaches from $+\phi$ to $-\phi$. With the repetition of these operations, the on-off repeating operations of the transistors Tr1 and Tr2 are continued. Therefore, a rectangular wave power, which is converted in a voltage from 48-volt to 12-volt, is generated at output coils N$_5$ and N6, respectively and then rectified by diode D1 and D1, respectively. Furthermore, the rectified power to a direct-current is smoothed by a smoothing circuit constituted by a choke coil L1 and a condenser C1 and outputted from an output port as an output voltage of a 12-volt DC electric power.

Figure 4:
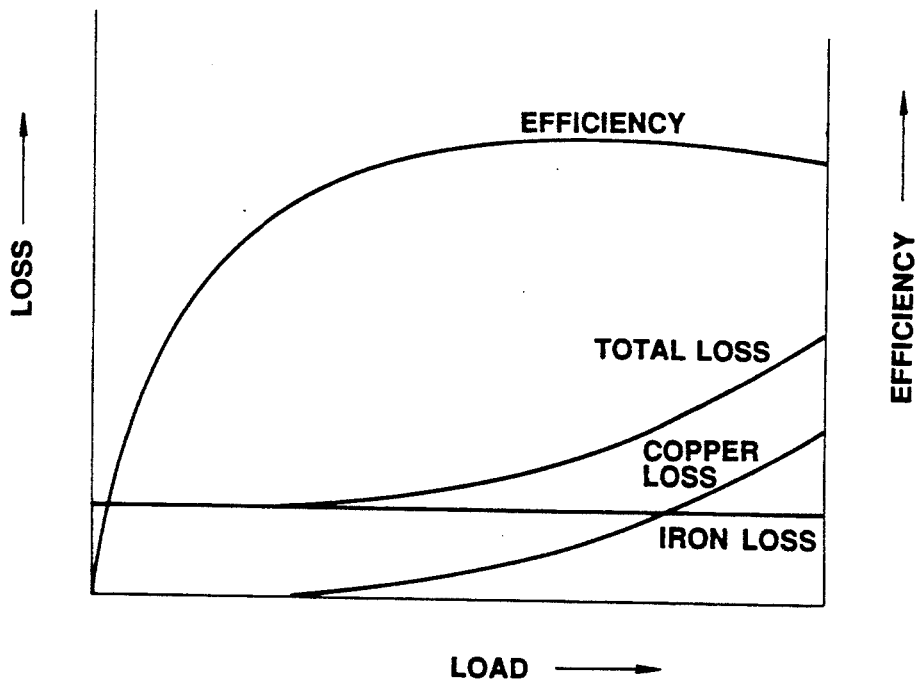
FIG. 4 is a graph showing changes of conversion efficiency and loss of the DC—DC converter relative to a load applied thereto.

FIG. 4 shows a characteristics graph of losses and efficiency of the DC—DC converter 4 relative to a change of load under a constant voltage and a constant power factor (output). The efficiency of the DC—DC converter 4 radically increases in company with the increase of load from 0%. Then, it saturates at a predetermined value and gradually decreases in company with the approach of the load to 100%. The loss in the DC—DC converter 4 is mainly constituted by an iron loss unconcerned with the load current and a copper loss concerned with the load current. The other losses are negligible, due to their small value. Additionally, the copper loss is represented as follows:

$$\text{Copper Loss } PC = KmI_1^2 (r_1 + r_2')$$

wherein I$_1$ is a load current flowed in a primary coil, r$_1$ is a resistance of the primary coil, r$_2'$ is a resistance of a secondary coil converted to a primary side, and Km is a ratio AC resistance/DC resistance (normally 1.1 to 1.25).

Since the copper loss is in proportion to a square of the load current, the change of the copper loss is represented by a curve shown in FIG. 4. Efficiency $\eta$ of the converter is derived from the following equation:

$$\eta = K \cos \theta / (K \cos \theta + Pi + Pc) \times 100 \ [\%]$$

wherein K is a capacity [w] of the DC—DC converter, Pi is an iron loss [W], Pc is a copper loss [W] (KmI$_1^2$ (r$_1$+r$_2'$)), cos $\theta$ is a load power factor, and K cos $\theta$ is an output under a full load (rated output) [VA].

Figure 5:
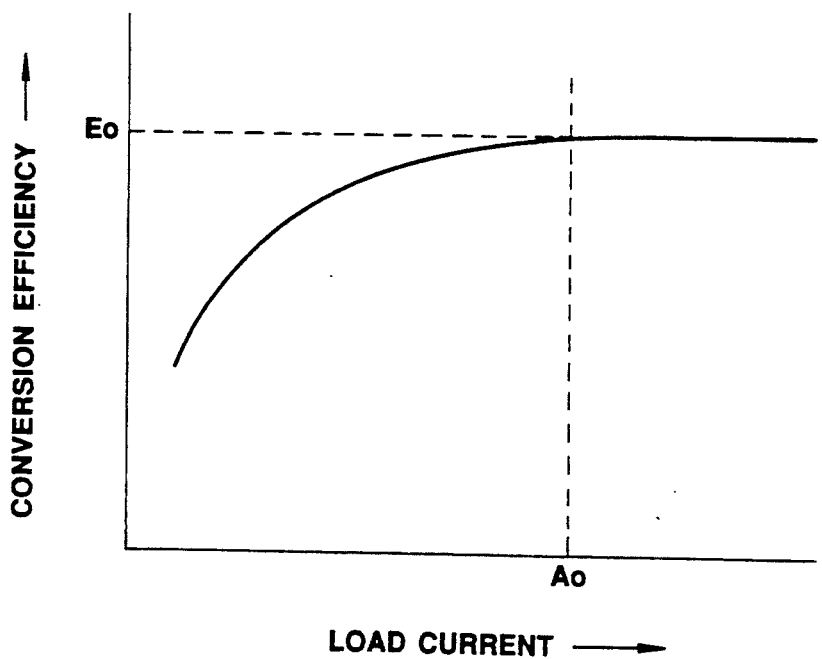
FIG. 5 is a graph showing a change of the conversion efficiency of the DC—DC converter relative to a load current.

Accordingly, the efficiency of the DC—DC converter 4 is represented by a curve shown in FIG. 4. That is to say, the conversion efficiency is kept good if the DC—DC converter 4 is operated while applying a load current value larger than a predetermined value. Accordingly, the conversion loss is suppressed in such a manner to operate the DC—DC converter 4 while applying a load current H larger than a value Ao as shown in FIG. 5 so as to keep the conversion efficiency E high.

Figure 6:
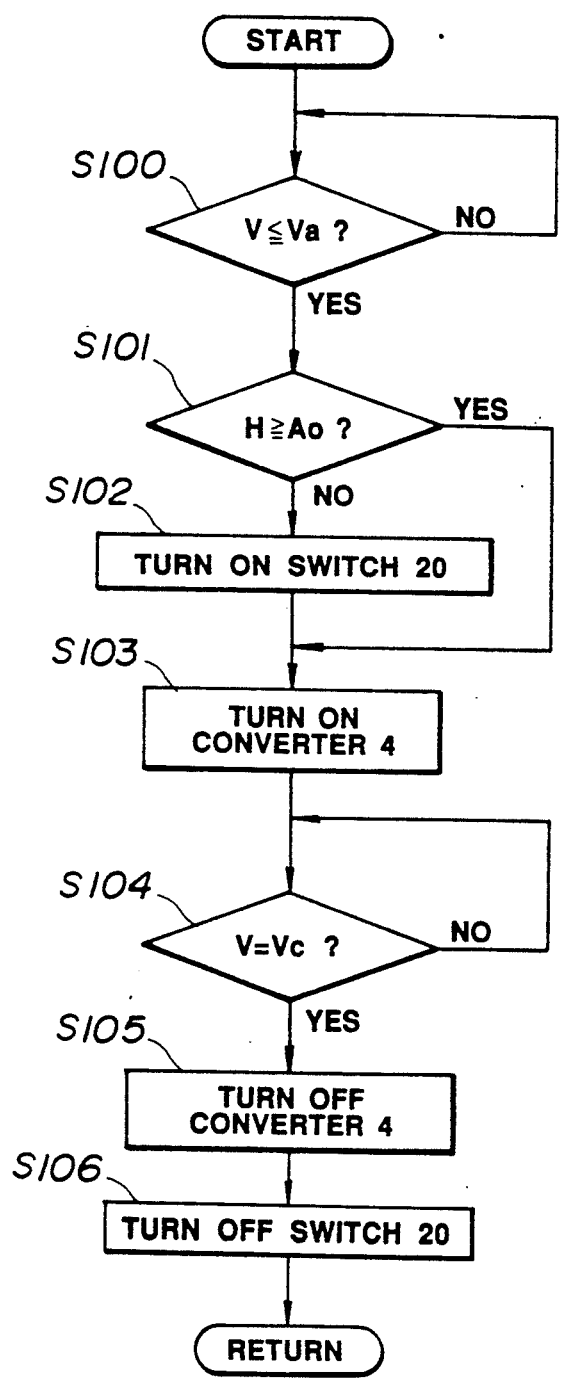
FIG. 6 is a flow chart showing a control of the first embodiment of FIG. 1.

FIG. 6 shows a control flow chart of the controller 8.

In a step S100 the controller 8 compares the voltage value V of the 12-volt battery 7 with a first predetermined value Va in order to judge the condition of charging. When V$\leq$Va, the program proceeds to a step S101, and when V>Va, the program returns to the step S100.

In the step S101 the controller 8 compares the load current H of the load 50 which has been detected by the ammeter 16 with a second predetermined value Ao indicative of the conversion efficiency of the DC—DC converter 4. When H≧Ao, the program jumps to a step S103, and when H has a different value, the program proceeds to a step S102.

In the step S102 the load current H is increased to be larger than or equal to the current value Ao at which the DC—DC converter 4 operates efficiently. This operation is carried out in such a manner that the controller 8 outputs a switch signal 14 to the switch 20 so as to close the switch 20. Electric power is supplied to the resistance 40 to reduce the resistance value of the load. With this switch turning-on operation, the load current H becomes larger than or equal to Ao. Then, the switch signal 14 is stopped such that the switch 20 is not turned off until the voltage value of the 12-volt battery 7 decreases to the value Vc.

In the step S103, the operation signal 11 is inputted from the controller 8 to the DC—DC converter 4 so as to be operated, and the 48-volt electric power from the generator 1 and the 48-volt battery 2 is converted into 12-volt electric power by the DC—DC converter 4. The converted 12-volt electric power is supplied to the 12-volt battery 7 and the load 50. In this situation, the 12-volt battery 7 takes as a load, which is arranged in parallel with the head lamp 4, the vehicle speed sensor 30 and the resistance 40 so as to form a circuit. Therefore, the electric power from the generator 1 and the 48-volt battery 2 is stably supplied to the 12-volt battery 7.

In a step S104, until V becomes equal to Vc(V=Vc), the program continues the operation in the step S103.

In a step S105 the operation of the DC—DC converter 4 is stopped by stopping the output of the operation signal 11 from the controller 8 to the DC—DC converter 4. Following this, in a step S106 the switch 20 is turned off by stopping the output of the switch signal 14.

With these operations, under normal condition, the blower motor 3 receives electric power from the generator 1, and the 48-volt battery 2, head lamp 5 and vehicle speed sensor 30 receive electric power from the 12-volt battery 7. Additionally, the charging of the 12-volt battery 7 is carried out after the voltage value of the 12-volt battery becomes lower than the value Va. Accordingly, the charging period for the 12-volt battery 7 becomes short, and therefore the operation period of the DC—DC converter 4 also becomes short. Furthermore, since the DC—DC converter 4 is operated in a range with high conversion efficiency by controlling the load current so as to be larger than a predetermined value, the electric power consumption is decreased.

Figure 7:
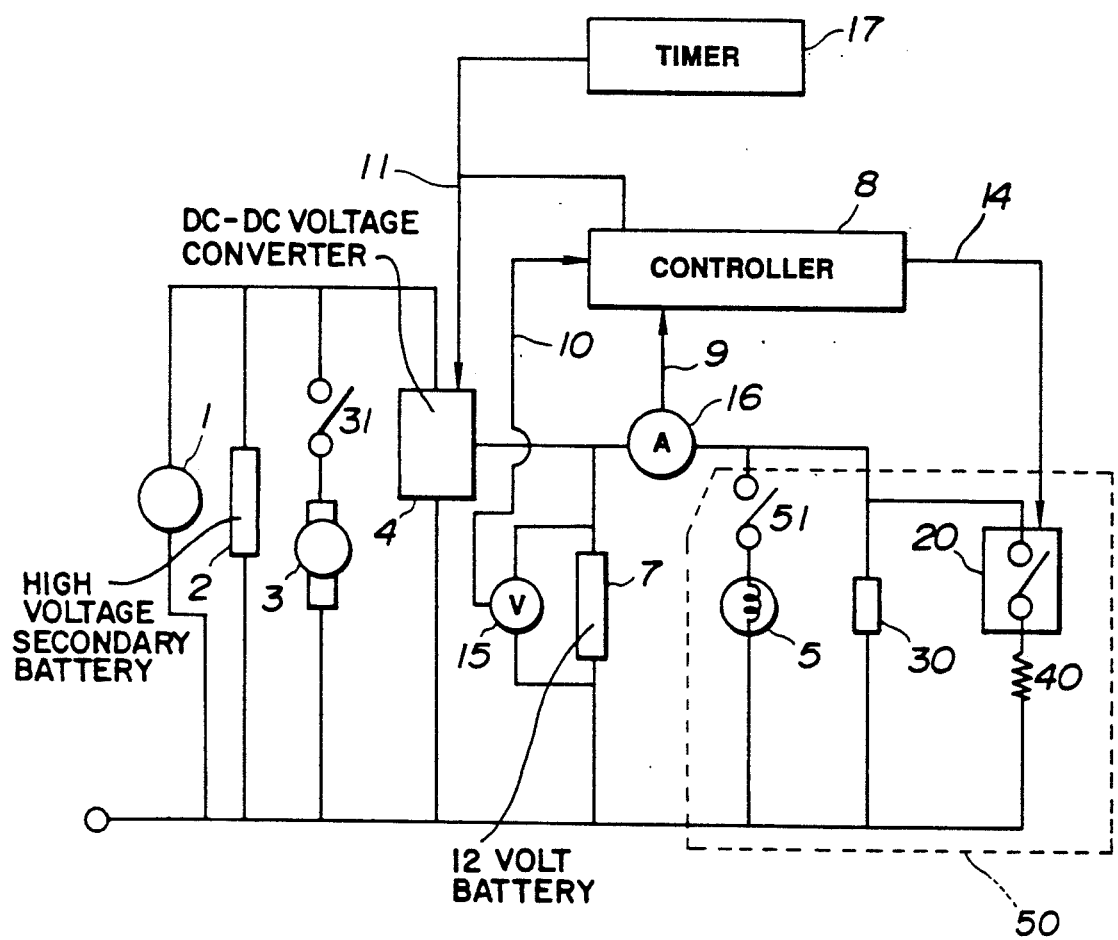
FIG. 7 is a schematic block diagram of a second embodiment of the electric power system according to the present invention.
Figure 8:
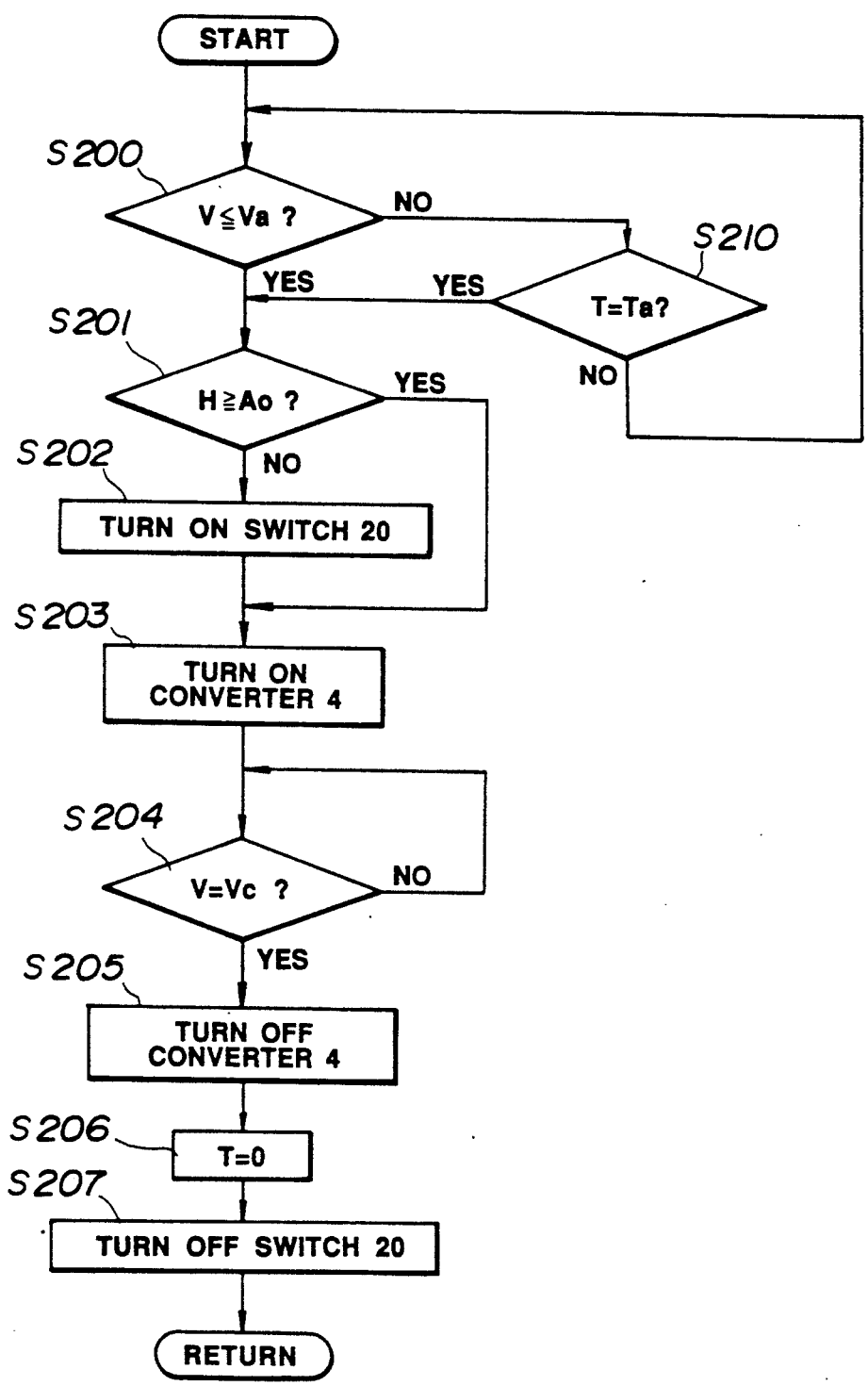
FIG. 8 is a flow chart showing a control of the second embodiment of FIG. 7.

Referring to FIGS. 7 and 8, there is shown a second embodiment of the electric power system according to the present invention. The second embodiment is generally similar to the first embodiment except that a timer 17 is included in the electric power system.

The timer 17 counts time and outputs an operation signal 11 to the DC—DC converter 4 to be operated when a predetermined time period has been elapsed after the low-voltage secondary battery 7 is charged to a predetermined voltage value.

The operation of this system will be discussed hereinafter according to the control flow chart shown in FIG. 8.

In a step S200 the controller 8 compares the voltage value of the 12-volt battery 7 with the first predetermined value Va. When V≦Va, the program proceeds to a step S201, and when V>Va, the program proceeds to a step S210.

In a step S210, it is judged whether or not the counted time period T by the timer 17 becomes equal to a predetermined time period Ta after the 12-volt battery 7 is charged until the voltage value Vc. When the judgement in the step S210 is "NO", the program returns to the step S200, and when the judgement in the step S210 is "YES", the program proceeds to a step S201 even if the voltage value V of the 12-volt battery 7 becomes larger than the predetermined value Va.

In the step S201 the controller 8 compares the load current H of the load 50 with a predetermined value Ao, which is of a limit value of the conversion efficiency of the DC—DC converter 4. When H≧Ao, the program Jumps to a step S203. When H<Ao, the program proceeds to a step S202.

In the step S202, the load current H is increased to be larger than or equal to the current value Ao at which the DC—DC converter 4 operates efficiently. This operation is carried out in such a manner that the controller 8 outputs a switch signal 14 to the switch 20 so as to turn on the switch 20, and electric power is supplied to the resistance 40. With this switch turning-on operation, the load current H of the load 50 becomes larger than Ao. Then, the switch signal 14 is once stopped such that the switch 20 is not turned off until the voltage value of the 12-volt battery 7 is decreased to the value Vc.

In the step S203, the operation signal 11 is inputted from the controller 8 to the DC—DC converter 4 so as to be operated, and the 48-volt electric power from the generator 1 and the 48-volt battery 2 is converted into 12-volt electric power by the DC—DC converter 4. The converted 12-volt electric power is supplied to the 12-volt battery 7 for charging and the load 50. In this situation, the 12-volt battery 7 takes as a load, which is arranged in parallel with the head lamp 4, the vehicle speed sensor 30 and the resistance 40 so as to form a circuit. Therefore, the electric power from the generator 1 and the 48-volt battery is stably supplied to the 12-volt battery 7.

In a step S204, until V becomes equal to Vc(V=Vc), the program continues the operation in the step S203.

In a step S205 the operation of the DC—DC converter 4 is turn off by stopping the output of the operation signal 11 form the controller 8 to the DC—DC converter 4.

In a step S206, the timer 17 is cleared (T=0). Following this, in a step S207 the switch 20 is turned off by stopping the output of the switch signal 14.

With these operations, under normal condition, the blower motor 3 receives electric power from the generator 1 and the 48-volt battery 2, and the head lamp 5 and the vehicle speed sensor 30 receives an electric power from the 12-volt battery 7. Additionally, the charging to the 12-volt battery 7 is carried out at a breath after the voltage value of the 12-volt battery becomes lower than the value Va. Accordingly, the charging period for the 12-volt battery 7 becomes short, and therefore the operation period of the DC—DC converter 4 also becomes short. Furthermore, since the DC—DC converter 4 is operated in a range performing a high conversion efficiency by controlling the load current so as to be larger than a predetermined value, the electric power consumption is decreased.

Furthermore, since the 12-volt battery 7 is charged according to the detected voltage value of the 12-volt battery value 7 and when the predetermined time period has been elapsed after the previous charging time of the 12-volt battery 7, the 12-volt battery 7 is securely charged and stably supplies electric power to the head lamp 5 and the vehicle speed sensor 30.

Although the batteries 2 and 7 have been shown and described as a lead battery in the embodiments, it will be understood that other secondary batteries, such as a Ni-Cd battery may be applied to the batteries 2 and 7.

With this arrangement, since the DC—DC converter 4 is arranged to be operated when the voltage value of the low-voltage secondary battery 7 becomes smaller than a predetermined value, the operating period of the DC—DC converter 4 is shortened.

Furthermore, since the DC—DC converter 4 is operated under a high efficiency load condition by increasing the load current when the value of the load current is smaller than a predetermined value. Additionally, since the electric power system further comprises a timer which operates said converter when a predetermined time period is elapsed after said low-voltage battery is charged to the predetermined value, it becomes possible to supply a stable electric power from the low-voltage secondary battery 7 to the load 50.

What is claimed is:

1. An electric power system for an automotive vehicle, comprising:
   a generator for generating electric power by using an engine as a driving source;
   a high-voltage secondary battery connected to an output terminal of said generator;
   a first load connected to the generator output terminal;
   a converter connected to the generator output terminal for converting electric power from a high-voltage to a low-voltage;
   a low-voltage secondary battery connected to an output terminal of said converter, said low-voltage secondary battery being charged by said converter;
   a second load connected to an output terminal of said low voltage secondary battery;
   a third load connected to the output terminal of said low-voltage secondary battery;
   a switch through which said third load is connected to said low-voltage secondary battery;
   a volt-meter connected to said low-voltage secondary battery for detecting the voltage of said low-voltage secondary battery,
   an ammeter connected to said second and third loads and detecting a load current applied to said second and third loads; and
   a controller controlling said converter to step operation when said volt-meter detects a voltage value larger than a first predetermined value, and to start the operation so as to charge said low-voltge secondary battery when said volt-meter detects a voltage value not larger than the first predetermined value, said controller controlling said switch to put said converter in a turned-on condition until said low-voltage battery is charged to a predetermined charged condition when the load current detected by said ammeter is smaller than a second predetermined value and put said converter in a turned-off conditions when the load current is not smaller than the second predetermined value.

2. An electric power system as claimed in claim 1, further comprising a timer which operates said converter when a predetermined time period has elapsed after said low-voltage battery is charged to the predetermined value.

3. An electric power system as claimed in claim 1, wherein said high-voltage battery includes a 48-volt battery and said low-voltage battery includes a 12-volt battery.

* * * * *